Aug. 7, 1956 R. S. WILLIAMS 2,758,221

MAGNETIC SWITCHING DEVICE

Filed Nov. 5, 1952

INVENTOR.
Raymond S. Williams
BY Morris L. Rabkin
ATTORNEY.

United States Patent Office 2,758,221
Patented Aug. 7, 1956

2,758,221

MAGNETIC SWITCHING DEVICE

Raymond S. Williams, Princeton, N. J., assignor to Radio Corporation of America, a corporation of Delaware Application November 5, 1952, Serial No. 318,819
9 Claims. (Cl. 307—88)

This invention relates to magnetic switching devices and more particularly is an improvement in magnetic switching apparatus.

There has been described in application of Jan A. Rajchman, Serial No. 275,622, filed March 8, 1952, for Magnetic Matrix and Computing Devices, now Patent 2,734,182, and assigned to the same assignee as the present application, a system whereby magnetic switching is accomplished in a random manner. The magnetic switch of the type intended is one wherein there are a plurality of cores of magnetic material which are capable of being selectively driven from a magnetic flux saturation having one polarity to a magnetic flux saturation having a second polarity. Output windings are inductively coupled to each of the saturable cores and a voltage is induced in an output winding as the core to which it is coupled is driven between saturation conditions. Such magnetic switches, which are capable of random operation, find their greatest applicability in combination with random access memories either of a magnetic type or of the type which can use the voltages induced when the magnetic material is turned over.

There are applications, however, for magnetic switching devices which do not have to be operable in a random fashion, but rather which provide output switching pulses which are sequential in occurrence. Operations involving scanning or sequential triggering are the type wherein such time sequence pulses find their greatest use.

It is accordingly an object of this invention to provide a magnetic switching device which furnishes time sequence pulses in response to an input pulse.

It is a further object of the present invention to provide a novel and inexpensive magnetic switch.

It is a further object of this invention to provide a new and useful, sequentially operating magnetic switch.

These and further objects of the invention are achieved by providing a magnetic switch consisting of a plurality of sections connected in cascade. Each section includes a magnetic toroidal core having wound thereon an input and an output winding. A condenser is connected to one end of the input winding. The other end of the condenser is connected to a common junction point to which the other ends of the other condensers in the remaining switch sections are connected. The input winding of each core is connected to the input winding of the following core. An input pulse is applied to the input winding of the first section to charge the condenser connected thereto through said input winding. Each condenser in turn is charged through the input windings of all the sections preceding that condenser. The outputs which are induced in the output coils when the cascaded magnetic cores are turned over are sequential in occurrence and a series of pulses are generated. The core material is selected to have a coercive force so that the applied pulse to the magnetic switch can drive the core from magnetic saturation in one direction to magnetic saturation in the opposite direction.

It will be appreciated that delay lines and/or filters have been constructed using inductances having magnetic material for cores. This is distinguishable over the present system in that the prior art devices use magnetic materials which are purposely operated over a small portion of their hysteresis curves in order to provide only a linearly functioning inductance. Great efforts are made to prevent saturation, either by the use of a great deal of magnetic material, or by the provision of large air gaps or by the limitation of the magnetomotive force which can be generated by the windings of the inductance. The use of these magnetic materials is chiefly to increase the available inductance and none other. The present device deliberately contemplates driving the materials to saturation in one polarity and to saturation in the second polarity. It also deliberatly uses the non-linear characteristics of magnetic materials for obtaining a novel and useful sequential commutating effect.

A further and more complete understanding of the invention will be obtained by a reading of the following description when taken in connection with the drawings, in which.

Figure 1:
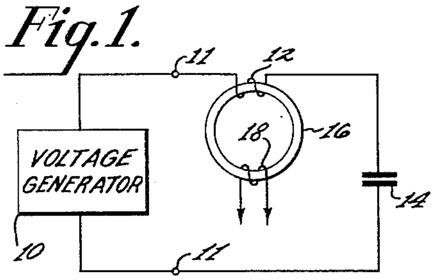
Figure 1 is a schematic drawing of a section of a magnetic switching system.
Figure 2:
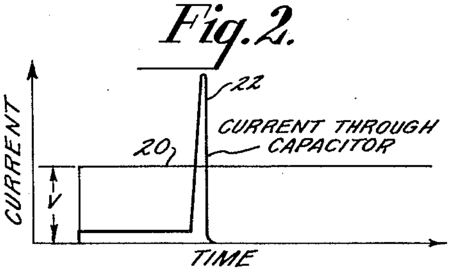
Figure 2 is a diagram of the wave shape of the voltages obtained in the operation of the circuit shown in Figure 1.
Figure 3:
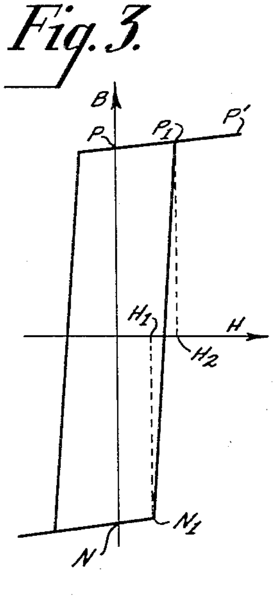
Figure 3 is a hysteresis curve showing desirable material characteristics.

Referring now to Fig. 1, there is seen a source of input voltage pulses by a voltage generator 10 which is connected by means of signal input terminals 11 through an input winding 12 to a capacitor 14. The input winding is wound upon a toroidal core of magnetic material 16. The core need not be toroidal altho this shape is preferred. The hysteresis characteristics of this material are approximately those shown in Fig. 3 of the drawings. An output coil 18 is also wound upon the core. Assume, for the purpose of explaining the operation of the circuit, that a voltage V, as shown by the solid line curve 20 in Fig. 2, is applied across the condenser 14 from the voltage generator 10 through the input winding 12. Since the toroidal core, at the outset, is in a saturated condition designated by point N on the hysteresis curve of Fig. 3, the inductance of the input winding will be quite low. It will also remain low until the core is driven from point N to point $N_1$ on its hysteresis curve. Accordingly, the current through the winding will rise very rapidly until the current corresponding to point $N_1$ is reached. This rate of rise of current is so rapid that little or no change of charge occurs in the condenser. Between point $N_1$ and $P_1$, when the magnetic core is in process of passing through a non-saturated region, the inductance of the input winding increases to a very great extent. As a matter of fact, this inductance may increase anywhere from 1,000 to 10,000 times. Accordingly, the further charging of the condenser 14 will be retarded, since, with the large impedance presented between the charging source and the condenser, a large charging current cannot flow in the circuit. The condenser charge during this interval will be slow and at a substantially steady rate. When the saturation of the magnetic material reaches point $P_1$, the inductance of the coil will have diminished again by virtue of the saturation of the core material. The charging current of the condenser will then rapidly increase to bring the voltage across the capacitor or condenser substantially to the same level as the charging voltage from the voltage generator. This first operation is then substantially complete. The curve 22 in Fig. 2 shows the charging current curve for the condenser 14. In the course of the change of the flux saturation of the core an output voltage is induced in the output winding 18.

The charging time for the condenser will depend upon a number of controllable factors. One, of course, is the time required for the magnetic material to be driven from saturation in one direction to saturation in the second direction. Another is the amplitude of the voltage applied by the voltage generator. A third is the size of the condenser which is being charged. A fourth factor is the load which is applied to the output winding. If current is drawn from the output winding, this will increase the charging current and hence will cause the capacitor to charge more rapidly. To overcome this, of course, a larger capacitor may be used which may, to a certain extent, slow down the operation of the switch.

In order to reset the switch to its initial starting condition, a pulse of opposite polarity may be applied to the input winding. The same operation occurs as has just been described, but of course the condenser will be charged to an opposite polarity. If desired, the switch may be reset by means of an auxiliary or second input winding (not shown) which provides a magnetomotive force which is required to reestablish the core in the condition in which it initially was.

Figure 4:
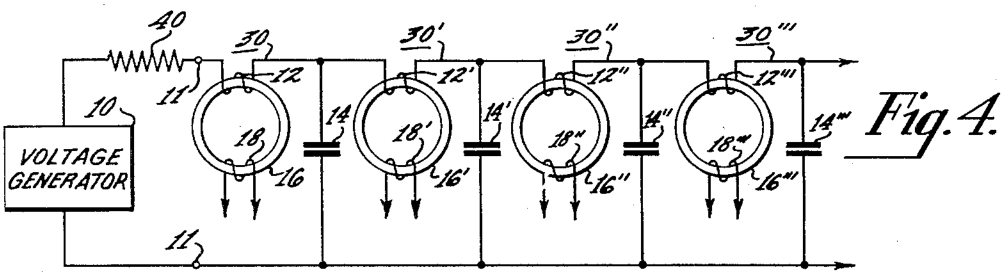
Figure 4 is a schematic diagram of an embodiment of the invention.

A plurality of the switching sections, 30, shown in Fig. 1, may be connected in cascade as is shown in Fig. 4.

There is at least one condenser individual to each coil 14, 14′, 14″, 14‴. One condenser terminal of each of these condensers 14, 14′, 14″, 14‴ is connected respectively to each coil 12, 12′, 12″, 12‴; the other condenser terminal of each of the condensers 14, 14′, 14″, 14‴ is connected to a common connection which includes one of the terminals 11. Similar function components have similar primed reference numerals applied. The input coil of a following section is connected in series with the input coil of a preceding section. Four sections 30, 30′, 30″, 30‴, are shown, but of course as many more may be added as are required. It will be noted that a resistance 40 is shown in series with the input voltage generator. This resistance 40 represents the characteristic impedance of the generator and should be matched to the characteristic impedance of the switch treated as a delay line composed of inductance elements equal to the saturated inductance of each core and the capacitances equal to the capacitances employed. Such impedance is necessary to minimize reflections traveling towards the source and to insure optimum power transfer.

Figure 5:
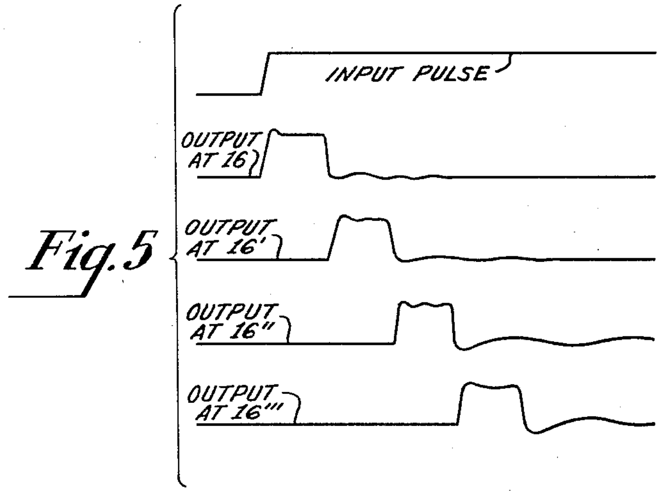
Figure 5 shows the wave shapes obtainable with such an embodiment of the invention.

In the operation of the sequential magnetic switch shown the input pulse must be maintained long enough for the magnetic core 16, 16′, 16″, 16‴, in each section to be turned over. In other words, every element in the switch will operate in turn until the entire switch has its magnetic cores saturated with the polarity of the driving current provided the applied pulse is of a sufficient length until this occurs. This is shown in Fig. 5, wherein the duration of the input pulse and the durations of the output pulses derived from each section as it is driven is shown against a common time scale. Thus the number of sections turned over may be used to measure the duration of an input pulse, if desired.

The switch may be reset by the application of pulses of opposite polarity to each section. Of course an output voltage will be induced in the output winding upon the resetting action. If desired, two output windings (not shown) may be provided which are oppositely wound so that the same polarity of output voltage is provided no matter which polarity of driving voltage is being applied to the switch. Alternatively, two oppositely wound output coils may be coupled together by crystal diodes to achieve a single polarity output.

It should be noted that this switch does not behave as the ordinary delay line, as the propagation time is not uniform over the entire switch as it is with the usual delay line. This can be appreciated from the fact that as the magnetic elements are driven to the saturation polarity caused by the driving pulse, the propagation time up to the core which is in the process of being turned over is substantially low, while delay action from that point forward due to the requirement for first charging the condenser will delay the propagation of the voltage. Consequently, if a driving pulse is too short, every core will not be operated. The number of cores that operate can be used as a measure of the total ∫edt of the driving pulse.

It is simple to arrange that the magnetic switch remain in synchronism with other time standards, as the output pulse from the switch may be compared with a standard pulse to produce a signal to control the amplitude of the voltage being applied to the magnetic switch. It will be remembered that, the speed of the operation of the switch can be controlled by controlling the amplitude of the voltage being applied.

The switch has been so far described as having a uniform switching action. It is possible to control this by varying the character of the cores and windings or the value of the capacitors or both to achieve switching action which is other than linear in time occurrence. Thus it is possible to make a switch of a logarithmic time scale or to any other desired function.

The magnetic material of which the toroidal cores are composed may have any desired hysteresis characteristic, rectangular or otherwise. It is most essential, however, that the property be a non-linear one and a rectangular hysteresis loop is an excellent non-linear characteristic for the material. Another desirable property is that the coercive force of the magnetic material be relatively low, since the lower the coercive force the lower the required driving voltage to cause the cores to be driven from magnetic saturation in one polarity to the opposite saturation polarity.

There has been described and shown herein a magnetic switch, which is simple, novel, economical and operates to provide output pulses in a sequential fashion.

What is claimed is:

1. A sequential pulse generating system comprising a plurality of magnetic cores, each of said cores being made of a material which is capable of being driven from magnetic flux saturation in one direction to magnetic flux saturation in the opposite direction through an unsaturated flux region, means to drive each core in sequence from one region to the other, including a plurality of condensers each of which is charged up as a different one of said cores in driven, and means to derive an output from each core.

2. A sequential switching system comprising a plurality of magnetic cores each being made of a material which is capable of being driven from magnetic flux saturation in one direction to magnetic flux saturation in the opposite direction through an unsaturated flux region, each core having an input winding and an output winding wound thereon, and a condenser having one end connected to said input winding; means connecting all said input windings in series, and signal input terminals connected to a first of said input windings and to all the other ends of said condensers.

3. In a sequential switching system a section of said system comprising a magnetic core made of material capable of being driven from magnetic flux saturation in one direction to magnetic flux saturation in the opposite direction through an unsaturated flux region, an input winding and an output winding wound on said core, a condenser having one end connected to one end of said input winding, and a pair of signal input terminals one of which is connected to the other end of said input winding and the other to the other end of said condenser.

4. A sequential magnetic switching system comprising a plurality of cascade connected sections each section including a core made of magnetic material capable of being driven from magnetic flux saturation in one direction and to magnetic flux saturation in the opposite direction through an unsaturated flux region, an input winding and an output winding on said core, and a condenser connected to one end of said input winding.

5. A sequential magnetic pulse generator system comprising a plurality of sections, an input terminal, and a common terminal; each said section including a core of magnetic material capable of being driven from magnetic flux saturation in one sense to magnetic flux saturation in the opposite sense through an unsaturated flux region, an input winding on said core and a capacitor; said input windings being connected in series between said input and common terminals, and each said capacitor being connected between the said winding of its section and said common terminal.

6. A sequential magnetic switching system comprising a plurality of cascade connected sections, each section including a core of magnetic material capable of being driven from magnetic flux saturation in one sense to magnetic flux saturation in the opposite sense through an unsaturated flux region, an input winding and a condenser connected between said winding and a common connection, the cascade connection including serial connections of said windings.

7. A sequential magnetic switching system comprising a plurality of saturable magnetic cores each having a winding, a pair of input terminals, said windings being connected in series to one of said terminals, a like plurality of condensers, one for and individual to each winding and connected between the winding terminal remote from said one input terminal and the other said input terminal.

8. A sequential magnetic switching system comprising a plurality of saturable magnetic cores each having a winding, said windings being serially connected, each pair of successive serially connected windings having a capacitor with one capacitor terminal connected to the junction between said pair of windings, and the other capacitor terminals connected to a common connection.

9. A magnetic switch comprising two sections, each having a saturable magnetic core having a winding, a condenser connected to be charged by current through said winding, and output means magnetically coupled to said core, the said windings of said sections being connected in series.

References Cited in the file of this patent

UNITED STATES PATENTS 2,652,501 Wilson ---------------- Sept. 15, 1953